United States Patent [19]

Bruning

[11] 4,006,389
[45] Feb. 1, 1977

[54] VARIABLE DISC CAPACITOR

[75] Inventor: Harvey R. Bruning, Millburn, N.J.

[73] Assignee: North American Philips Corporation, New York, N.Y.

[22] Filed: Mar. 10, 1975

[21] Appl. No.: 556,821

[52] U.S. Cl. .................. 317/249 D; 317/249 R
[51] Int. Cl.² .......................... H01G 5/06
[58] Field of Search .......... 317/249 R, 249 D, 253, 317/254

[56] References Cited

UNITED STATES PATENTS

| 1,713,134 | 5/1929 | Kent | 317/253 |
| 3,262,033 | 7/1966 | Culbertson | 317/253 |
| 3,681,664 | 8/1972 | Metzger | 317/249 D |

FOREIGN PATENTS OR APPLICATIONS

| 924,299 | 7/1947 | France | 317/249 D |
| 712,814 | 10/1941 | Germany | 317/249 D |
| 566,986 | 1/1945 | United Kingdom | 317/249 D |
| 595,012 | 11/1947 | United Kingdom | 317/249 D |

Primary Examiner—E. A. Goldberg
Attorney, Agent, or Firm—Frank R. Trifari; Daniel R. McGlynn

[57] ABSTRACT

A miniaturized variable capacitor including a stator and a rotor, a pinion rivet fixed to the rotor, and a spring clamp terminal electrically connected to the rotor electrode and cooperatively engaged with the pinion rivet for pressing the stator and rotor together.

8 Claims, 8 Drawing Figures

VARIABLE DISC CAPACITOR

BACKGROUND OF THE INVENTION

The invention relates to miniaturized electronic components, and particularly to the terminal construction for miniature variable capacitors.

Miniaturized disk capacitors having a rotor and stator assemblies are well-known in the art. One known disk trimmer capacitor includes stator and a rotor assemblies held together by an adjustable rivet and a spring clamp. Separate terminal leads are provided for both the stator and the rotor. Such known designs are disadvantageous in many applications where simplicity, compactness, and low cost are important considerations.

SUMMARY OF THE INVENTION

It is an object of the invention to provide a miniaturized electronic component utilizing a simple contact and clamping mechanism.

It is another object of the invention to provide a miniaturized electronic component including a pinion rivet mating with a correspondingly formed and subsequently bowed spring terminal.

It is yet another object of the invention to provide a variable disk capacitor having rotor and stator assemblies, and utilizing a rotor terminal which also serves as a spring clamp for engaging the shaft of a rivet.

Another object of the invention is to provide a miniature trimmer capacitor employing a contact mechanism which readily compensates for wear during tuning, while maintaining a firm and smooth tuning torque.

It is another object of the invention to provide means for securing the stator and rotor of a miniature electronic component together while simultaneously providing a reliable, highly conductive path from the rotor to the rotor terminal.

Another object of the invention is to provide a miniature trimmer capacitor utilizing a minimum number of discrete components.

The present invention provides a variable disk capacitor having first and second terminals comprising a first disk of ceramic material and including a first electrode; a second disk of dielectric material including a second electrode, and means for pressing said first disk against said second disk, comprising a pinion rivet and a spring clamp terminal, the rivet having a shaft extending through the first and second disks and cooperatively engaging the spring clamp, the spring clamp also serving as one of the terminals of the capacitor.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

BRIEF DESCRIPTION OF THE DRAWINGS

Like numerals represent like elements in each of the views of the drawing.

DESCRIPTION OF THE PREFERRED EMBODIMENTS

Figure 1:
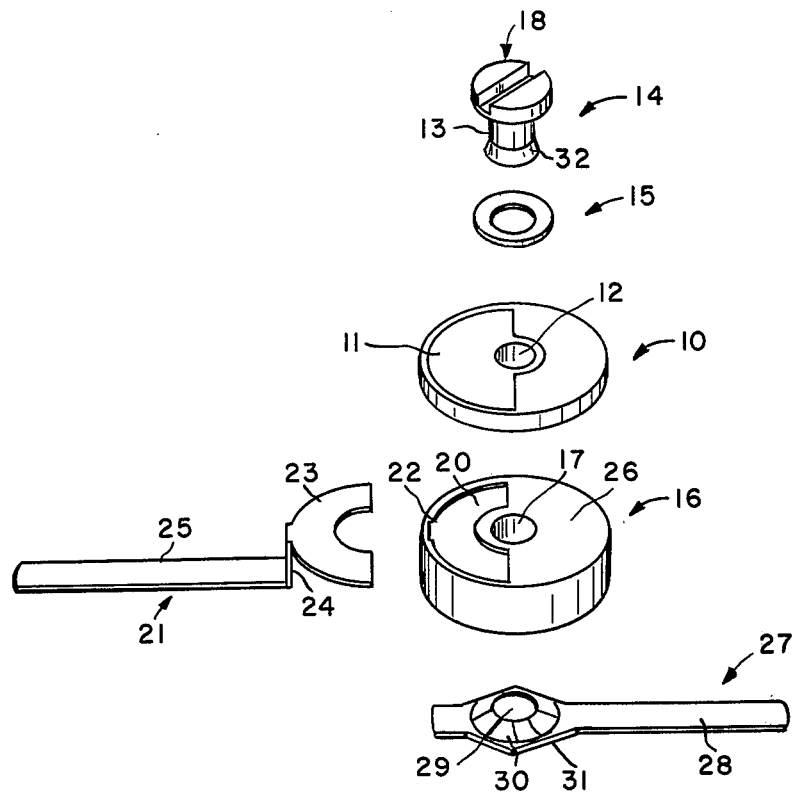
FIG. 1 is an exploded perspective view of a miniaturized trimmer capacitor incorporating a flared pinion rivet mating with a correspondingly formed spring terminal according to the present invention.

Referring now to FIG. 1, there is shown in an exploded perspective view the components used in the construction of the miniature variable capacitor after assembly. The Figure shows a ceramic disk 10, including an electrode 11. The electrode may have various shapes or positions, but is shown here for simplicity as being metallized on the upper surface of the disk 10 in a plane half-moon configuraton. The metallization extends circumferentially around and through the opening of a cylindrical hole 12 which passes through the center of the ceramic disk 10. The hole 12 is adapted to receive the cylindrical shaft 13 of a pinion rivet 14 used for assembling the capacitor. During assembly, the rivet 14 is first fixedly secured to the ceramic disk 10 by means of a pre-formed washer 15 composed of solder sheet material. During assembly, the rivet 14 is soldered to the ceramic disk 10, and, more specifically, provides electrical connection to the metallized electrode 11. The washer 15 continues to provide electrical connection between the metallized electrode 11 and the rivet 14 after assembly.

A base 16 is provided in the form of a disk composed of a high-grade dielectric material, such as high temperature epoxy, and having substantially the same diameter as the ceramic disk 10. A hole 17 is also provided in the base 16 for receiving the extension of the shaft 13 of the rivet 14 emerging from the ceramic disk 10. Since the rivet 14 and the ceramic disk 10 are fixedly joined together, the assembly comprising elements 10 and 14 may rotate relative to the base 16 when the shaft 13 is placed in the hole 17. In this configuration, the elements 10 and 14 may be referred to as the rotor assembly of the trimmer capacitor. A slot or tool-receiving head 18 is provided at the upper end portion of the rivet 14 for receiving a tool to enable the mechanical rotation of the rotor with the extended shaft 13 in the hole 17 of the base 16.

The stator terminal 21 is made from a sheet of flat metal which is formed and bent into three portion: an electrode portion 23, a lead portion 24, and a terminal portion 25. After the terminal 21 has been formed into the shape shown in FIG. 1, it is placed in a mold and integrally molded with the base 16. The terminal 21 is positioned in the mold so that electrode portion 23 forms a plane surface substantially near the upper surface 26 of the base 16. The position of the electrode 23 is indicated by the half-moon shape area 20 on the upper surface 26 of the base 16. The lead portion 24 extends through the base 16, as shown by passage 22, and terminates in the terminal portion 25 before reaching the lower surface of the base 16. The terminal portion 25 extends substantially perpendicular to the lead portion 24, and radially outward from the base 16. The terminal 21 and base 16 are said to form the stator assembly.

After molding of the base 16, the upper surface 26 is polished and lapped to expose the electrode portion 23 of the stator terminal 21. The bottom face of the ceramic disk 10 has also been polished and lapped flat so that the disk 10 and the base 16 are adapted to meet in a smooth surface-to-surface contact.

The rotor terminal 27 is shown below the base 16 in FIG. 1, and consists of an elongated terminal portion 28, having a relatively wider portion 31 through which a hole 29 is situated. The hole 29 is adapted to receive the extended shaft 13 of the rivet 14 after passing through the ceramic disk 10 and the base 16 respectively. The wider portion 31 of the rotor terminal 27 is also provided with a flared cone-like shaped proturbance 30 surrounding the hole 29. The purpose of the cone-like surface 30 is to engage and secure the flared bottom portion 32 of the rivet 14 which forms after flaring of the rivet 14.

Figure 2:
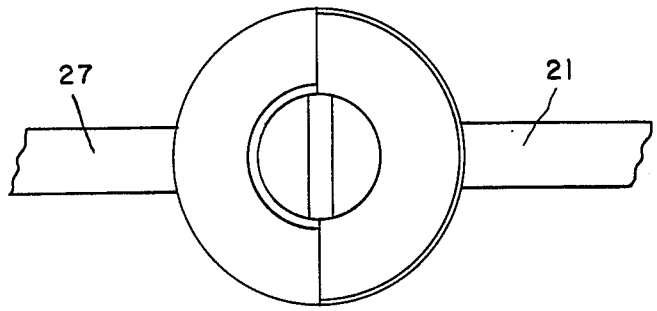
FIG. 2 is a top plan view of the assembled capacitor of FIG. 1.

FIG. 2 is a top plan view of the assembled capacitor shown in FIG. 1. The top view shows the stator lead 21 and the rotor lead 27 extending at diametrically opposite points from the assembly.

Figure 3:
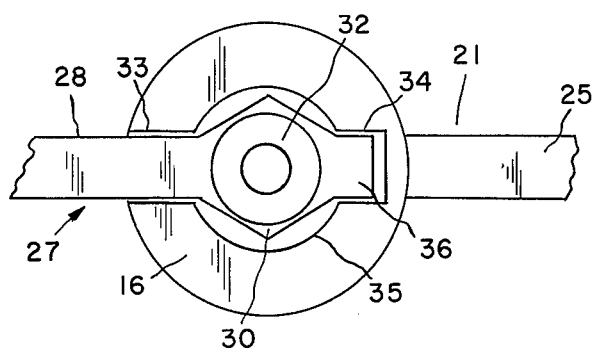
FIG. 3 is a bottom plan view of the capacitor of FIG. 2.

FIG. 3 is a bottom plan view of the capacitor of FIGS. 1 and 2. The rotor terminal 27 is shown fitting into a cut-out 33, 34, 35 on the bottom surface of the base 16. The cut-out comprises a circumferentially extending portion 35 adapted to receive the wider portion 31 of rotor terminal 27, and two radially extending portions 33 and 34 adapted to receive the elongated portions 28 and 36 of the rotor terminal 27 respectively. The terminal portion 28 serves as the external contact to the rotor terminal 27, and therefore extends radially outside the circumference of the base 16. The portion 36 of the rotor terminal 27 serves to securely clamp the terminal 27 in the base when subjected to the upward force from the shaped portion 32 of the rivet 14.

During actual tuning of the capacitor, shaped portion 32 rotates with respect to the proturbance 30, while the cut-out portions 33, 34 and elongated portions 28, 36 respectively engage each other so as to prevent rotation of the rotor terminal 27 with respect to the base 16.

The cut-out portion 34 does not extend to the circumference of the base 16, thereby isolating the electrically conductive portion 36 of the rotor terminal 27 from the electrically conductive portion 25 of the stator terminal 21.

Figure 4A:
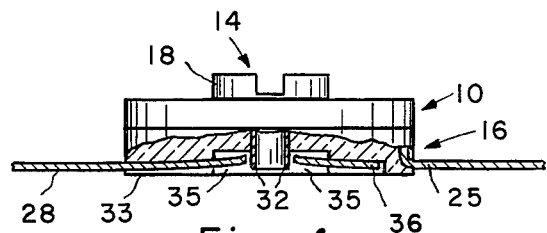
FIG. 4a is a cross-sectional view of the capacitor of FIG. 2 taken across the section line A—A in FIG. 2 before flaring of the rivet.

FIG. 4a is a cross-sectional view of the capacitor taken across the section line A—A of FIG. 2 before flaring of the rivet 14, i.e. before formation of the bottom portion 32. In particular, the generally straight shaft 13 of the rivet 14 should be noted extending through the disk 10, the base 16, and the hole 29 of the rotor terminal 27. The rotor assembly, comprising rivet 14 and disk 10, is freely rotatable with respect to the base 16 and rotor terminal 27.

Figure 4B:
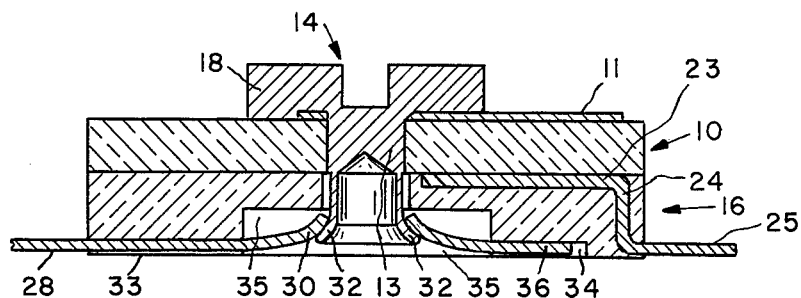
FIG. 4b is a cross-sectional view of the assembled capacitor of FIG. 2 taken across the section line A—A in FIG. 2 after flaring of the rivet.

FIG. 4b is a cross-sectional view of the capacitor taken across the section line A—A of FIG. 2 after flaring of the rivet 14, i.e. after formation of the bottom portion 32. As seen in the FIG. 4b, the bottom portion 32 engages the proturbance 30 of the rotor terminal 27, and pulls it upward. The elongated portion 28 and 36 are pressed into cut-outs 33 and 35 of base 16 respectively, the terminal 27 therefore bending or bowing in the region of the wider portion 31 surrounding the proturbance 30 as a result of the upward force. The bending or bowing action of the rotor terminal 27 permits it to act as a spring clamp for clamping the disk 10 and base 16 together, while at the same time allowing the disk 10 and base 16 to rotate with respect to one another in surface-to-surface contact during tuning of the capacitor.

Figure 5A:
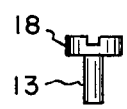
FIG. 5a is a side view of the pinion rivet for the capacitor shown in FIG. 1 prior to assembly.

FIG. 5a is a side view of the pinion rivet 14 for the capacitor prior to assembly, i.e. prior to formation of the flared bottom portion 32. It is noted that the shaft 13 is essentially straight.

Figure 5B:
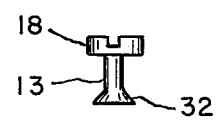
FIG. 5b is a side view of the pinion rivet for the capacitor shown in FIG. 1 after assembly of the capacitor.
Figure 6:
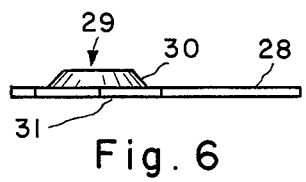
FIG. 6 is a side view of the spring terminal for the capacitor as shown in FIG. 1.

FIG. 5b is a side view of the pinion rivet 14 after assembly of the capacitor, i.e. incorporating the flared bottom portion 32. FIG. 5b in particular illustrates the 45° angle of the flared portion with respect to the extended shaft 13. The pinion rivet 14 has a hollow portion (not shown) on the end of the shaft 13. During assembly, a tool is inserted into this opening in the shaft 13, and pressure applied. The pressure bends the annular surface of the shaft outward until it contacts the proturbance 30 of the rotor terminal 27. The bottom portion 32 will then form into a shape that closely corresponds to the shape of the proturbance 30. In the present case it is a 45° cone-like flared portion. Reference may be made to FIG. 4b to indicate how the shape of the proturbance 30 and the bottom portion 32 correspond after assembly.

Optimum results are obtained by using a 45° flaring angle for the cone-like shaped proturbance 30 and the pinion rivet 14 as measured with respect to the elongated terminal member 28 or shaft 13. Such results provide highest Q, a very low contact resistance, and a smooth yet firm tuning torque.

The flared cone-like shaped proturbance 30 and mating bottom portion 32 may take a variety of forms. The present invention is intended to include proturbances of all forms including spherical, semi-spherical, dome-shaped, or other convex geometrical shapes.

Since the shaped bottom portion 32 and the proturbance 30 cooperatively form the electrical connection between the rotor and the rotor terminal 27, it has been found advantageous to utilize dissimilar plating materials of low resistivity, such as silver and gold, on the respective surfaces. The contact mechanism of the present invention formed by the proturbance 30 and the bottom portion 32 has been found to compensate for wear during tuning of the capacitor, that is, rotation of the rotor assembly 14 and 10. Experiments have shown that the contact mechanism maintains a firm and smooth tuning torque after extended use. The amount of tuning torque and clamping force obtained is governed by the depth of the flaring portion 32 of the pinion rivet shaft 13, the subsequent bowing of the wider portion 31 and proturbance 30 of the rotor terminal 27, and the angle of flaring of the proturbance 30 on this terminal. The resulting flaring angle of the portion 32 also effects the tuning torque and clamping force.

Various materials may be used for the contact mechanism for providing self-centering, clamping, low electrical noise, and smooth tuning torque of the device. The choice of plating, tempering, forming and flaring angles are selected to ensure a contact mechanism which maintains a high metallic surface contact so important in high current, high frequency RF applications utilizing trimmer capacitors. The arrangement according to the present invention provides such a contact mechanism in a simple and easy-to-assemble format using a minimum number of discrete elements.

While the invention has been illustrates and described as embodied in a Variable Capacitor Contact Mechanism, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitutes essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A variable disk capacitor having first and second terminals comprising
   a first disk of dielectric material and including a first electrode;
   a second disk of dielectric material and including a second electrode; and
   means for pressing said first disk against said second disk, comprising
   a rivet having a shaft rotatably extending through said first and said second disks; and
   a monolithic spring clamp serving as one of said terminals; comprising an elongated strip including a portion having a convex proturbance extending at an angle approximately 45° with respect to said elongated strip on one side of said strip, said proturbance having an opening therein for receiving said extended shaft of said rivet and being cooperatively matable therewith in a direct physical contact by means of a conically shaped flaring portion of said rivet extending at an angle of approximately 45° with respect to said shaft and engaging the underside, concave portion of said proturbance in said strip having an extended portion in the plane of clamping relationship.

2. A variable disk capacitor as defined in claim 1, wherein said rivet is fixedly secured to said first disk, electrically connected to said first electrode, and wherein said shaft coaxially extends through said first and second disks.

3. A variable disk capacitor as defined in claim 1, wherein said spring clamp includes an elongated terminal portion extending radially beyond the circumference of said disks.

4. A variable disk capacitor as defined in claim 1, wherein said proturbance is essentially conically shaped.

5. A variable disk capacitor as defined in claim 1, wherein said proturbance is essentially dome-shaped.

6. In a variable disk capacitor, the combination comprising:
   a rotor body, comprising a generally flat disk of ceramic material having a first opening therein, a first electrode in the form of a metallized plane surface, and adjustment means fixedly secured to said rotor body and in electrical contact with said first electrode; said adjustment means having a conductive shaft extending through said first opening and emerging therefrom;
   a stator body, comprising a generally flat disk of insulating material having a second opening therein, said extending shaft of said adjustment means extending therethrough for rotatably securing said rotor body coaxially with said stator body in substantially surface-to-surface contact, said stator body having a diametrically extending groove on the lower surface of said stator disk; and
   an elongated strip situated in said extending groove, said strip including a predeterminedly shape proturbance with a concave portion thereon, the underside concave portion of said proturbance mating with and clampingly engaging in direct physical contact a correspondingly shapeable end portion of said shaft for pressing said stator body against said rotor body.

7. An adjustable electronic component comprising:
   a rotor assembly including a first disk member including a rotor electrode;
   a stator assembly including a second disk member including a stator electrode;
   a rotor terminal in electrical contact with said rotor electrode, comprising a substantially flat elongated monolithic strip having a contact portion comprising a truncated conical proturbance having a substantially continuous circumferential contact surface extending at a predetermined angle with respect to said strip and having an opening therein; said elongated strip being a substantially rectangular spring clamp bowed in under tension in the region of said contact portion against a portion of said stator assembly for pressing said first and second members together; and
   a rivet fixedly secured to said rotor assembly, extending through said opening and cooperatively engaging said contact portion of said strip in direct physical contact including a flaring portion projecting at said predetermined angle for rotatably securing and physically engaging said contact portion on the underside thereof with said engagable means in a substantially surface-to-surface contact, thereby rotatably securing said rotor assembly with said stator assembly.

8. A component as defined in claim 7, wherein said second member is a disk and includes a linear groove adapted for receiving said elongated strip, said groove extending radially from the center of said disk to the edge of said disk, in one direction, and to a predetermined point before the edge of said disk in the diametrically opposite direction.

* * * * *